UNITED STATES PATENT OFFICE.

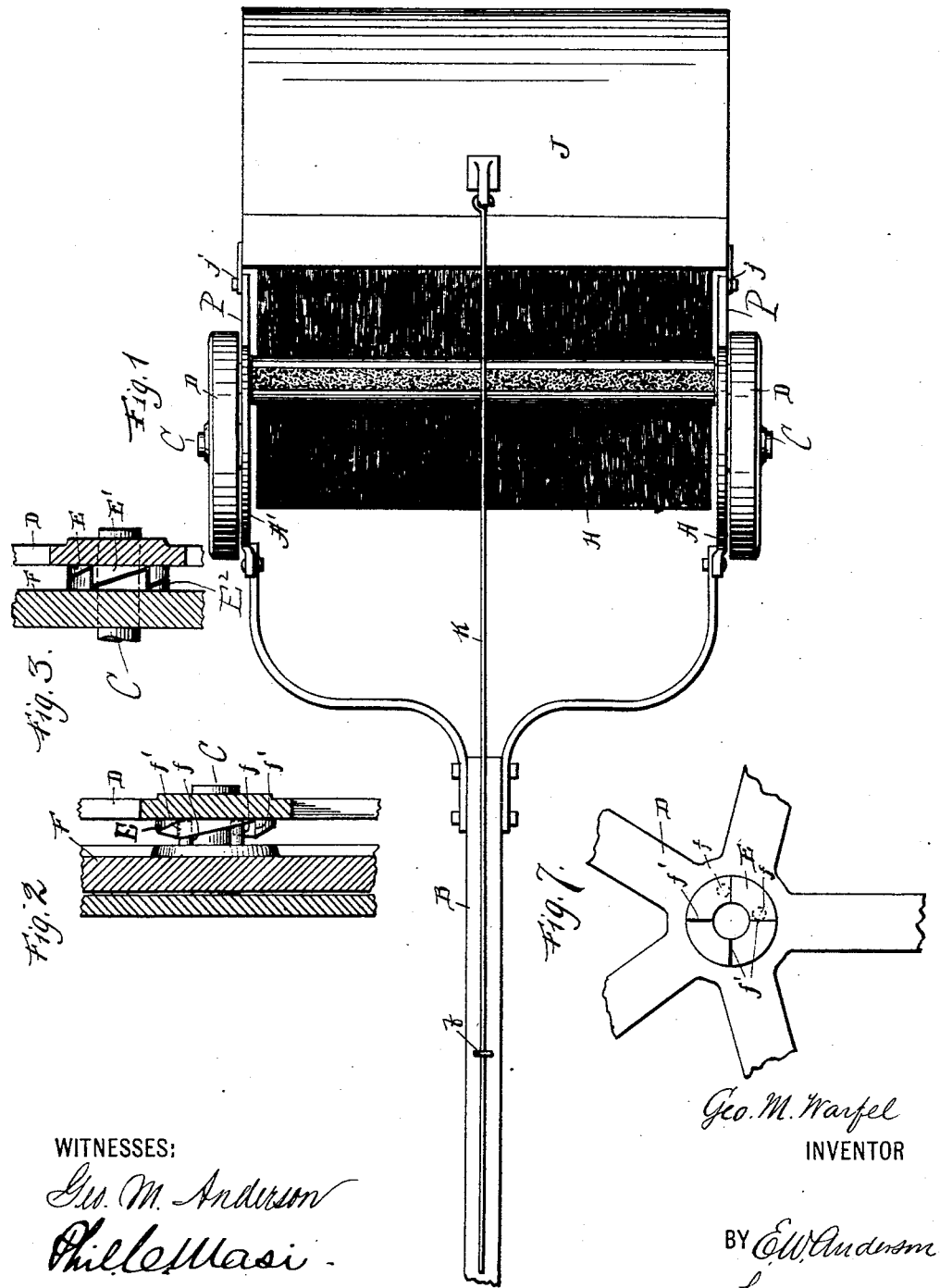

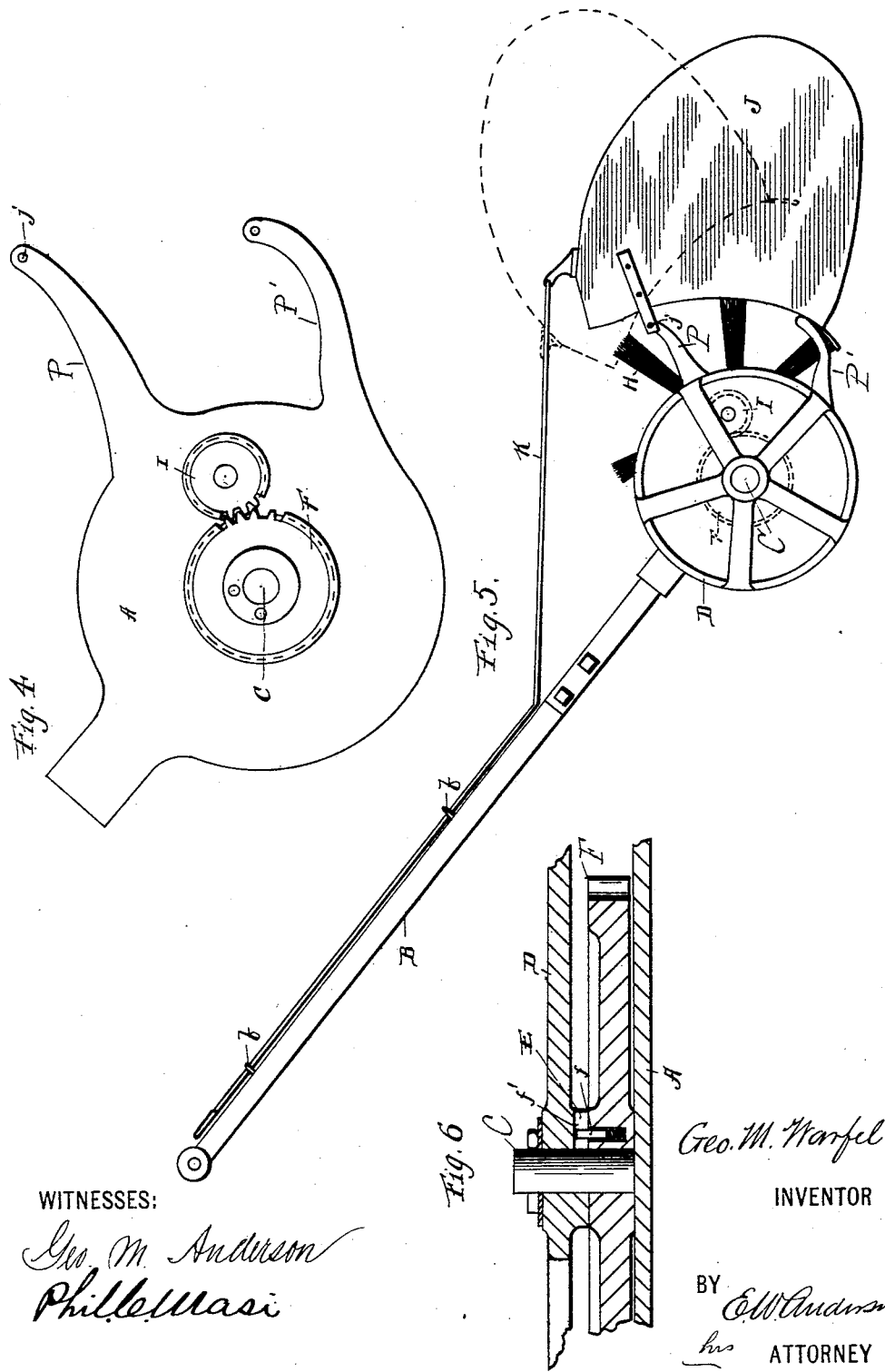

GEORGE MARTIN WARFEL, OF SPRINGFIELD, OHIO.

LAWN-SWEEPER.

SPECIFICATION forming part of Letters Patent No. 586,513, dated July 13, 1897.

Application filed November 16, 1894. Renewed January 14, 1897. Serial No. 619,270. (No model.)

*To all whom it may concern:*

Be it known that I, GEORGE MARTIN WARFEL, a citizen of the United States, and a resident of Springfield, in the county of Clark and State of Ohio, have invented certain new and useful Improvements in Lawn-Sweepers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a plan view of the invention. Fig. 2 is a detail of the clutch-and-pin connection of the driving and gear wheels. Fig. 3 is a detail sectional view illustrating a modification of the clutch connection. Fig. 4 is an elevation of frame-plate, showing gear-wheels. Fig. 5 is an elevation of invention, showing grass-pan elevated in dotted lines. Fig. 6 is a detail of clutch-and-pin connection between driving and gear wheels. Fig. 7 is a detail of clutch on driving-wheel, the positions of pins on opposing gear-wheel being in dotted lines.

The object of my invention is to provide a machine of simple construction and operation for the purpose of sweeping lawns after the grass thereof has been cut with a mower; and the invention consists in the novel construction and combination of parts, all as hereinafter described, and pointed out in the appended claim.

Referring to the accompanying drawings, the letters A A' designate two lateral parallel edgewise-disposed frame plates or disks, to which are attached the arms of a forked handle B. Projecting from the outer face of each of the plates or disks A A' is an axle stud or journal C, and upon these studs or journals are loosely journaled drive-wheels D D. On the hub of one of said wheels is a clutch-section E, having a series of clutch-teeth $f'$.

F is a gear-wheel which is journaled loosely on the stud C inside the flange of the driving-wheel. The hub portion of this gear-wheel is provided with clutch-pins $f$, which seat upon springs in sockets of said hub portion. Upon the forward movement of the machine the teeth $f'$ catch these pins $f$, and a driving connection is formed for the gear-wheel F, but upon the backward movement of the machine said teeth pass the pins idly.

In Fig. 3 I have shown a modified form of the clutch connection wherein the hub portion of the drive-wheel D is formed with a series of ordinary clutch-teeth E', which, upon forward movement of the machine, engage with a series of similar teeth $E^2$ upon the gear-wheel F.

H designates a brush whose shaft is journaled in the plates or disks A A' and which carries at one end portion thereof a pinion I, which meshes with the gear-wheel F.

Each disk or plate A A' has at its front edge a forwardly and upwardly projecting arm P near the top and a similar arm P' near the bottom. Pivotally connected to the upper arms P is a grass-pan J, which extends parallel with the brush and just in front thereof. Said pan comprises an elongated receptacle of general oval form in cross-section and closed upon all sides except that which faces the brush, which is open and curved approximately to the radius of the brush. Said pan is normally held in the position shown in full lines in Fig. 5, its lower portion resting against the arms P', which form stops therefor to hold it in proper relation to the brush. Loosely attached to the upper central portion of the pan is a rod which extends to and along the handle B in suitable guides thereon to within convenient reach of the operator, who, by means thereof, can dump the pan, as indicated by the dotted lines in Fig. 5.

Having thus described my invention, what I claim as new, and desire to secure by Letters Patent, is—

In a lawn-sweeper, the combination with the lateral frame-plates A, A', having each at its front edge an upper, forwardly-projecting arm P, and a lower arm P', and a forked handle attached to said plates, of a grass-pan pivotally connected with the said arms P and normally resting against the arms P', which form a stop to hold said pan in proper position, a rod loosely attached to the upper central portion of said pan and extending to and along said handle, a rotary brush journaled in said plates directly behind said pan, and clutch-controlled gear for operating said brush, substantially as specified.

In testimony whereof I affix my signature in presence of two witnesses.

GEORGE MARTIN WARFEL.

Witnesses:
FRED A. LEWIS,
DAVID STROCK.